United States Patent [19]
Field, II

[11] 3,777,196
[45] Dec. 4, 1973

[54] LOW-INERTIA SYNCHRONOUS INDUCTOR MOTOR

[75] Inventor: John H. Field, II, Needham, Mass.

[73] Assignee: Sigma Instruments, Inc., Braintree, Mass.

[22] Filed: Oct. 20, 1972

[21] Appl. No.: 299,407

[52] U.S. Cl. .................. 310/156, 310/162, 310/49
[51] Int. Cl. ............................................. H02k 21/12
[58] Field of Search ...................... 310/46, 49, 156, 310/162–164, 261

[56] References Cited
UNITED STATES PATENTS

| | | | |
|---|---|---|---|
| 2,120,109 | 6/1938 | Merrill | 310/156 |
| 2,931,929 | 4/1960 | Snowdon et al. | 310/156 |
| 3,230,406 | 1/1966 | Henry-Baudot | 310/156 |
| 3,453,465 | 7/1969 | DeBoer et al. | 310/49 |
| 3,535,604 | 10/1970 | Madsen et al. | 310/49 X |
| 3,558,941 | 1/1971 | Brebbia et al. | 310/156 X |
| 3,678,311 | 7/1972 | Mattingly | 310/156 |

Primary Examiner—D. F. Duggan
Attorney—David Toren, Bernard X. McGeady and Leo Stanger

[57] ABSTRACT

The rotor structure of a synchronous inductor motor, such as a stepping motor, is of a compact, low-inertia and high-magnetic efficiency construction wherein a relatively thin axially-magnetized annular washer is fixed intermediate the wholly planar end surfaces of relatively lightweight back-to-back cup-shaped pole pieces and extends radially from a relatively large central shaft fully to the roots of the pole-piece teeth.

7 Claims, 5 Drawing Figures

PATENTED DEC 4 1973 3,777,196
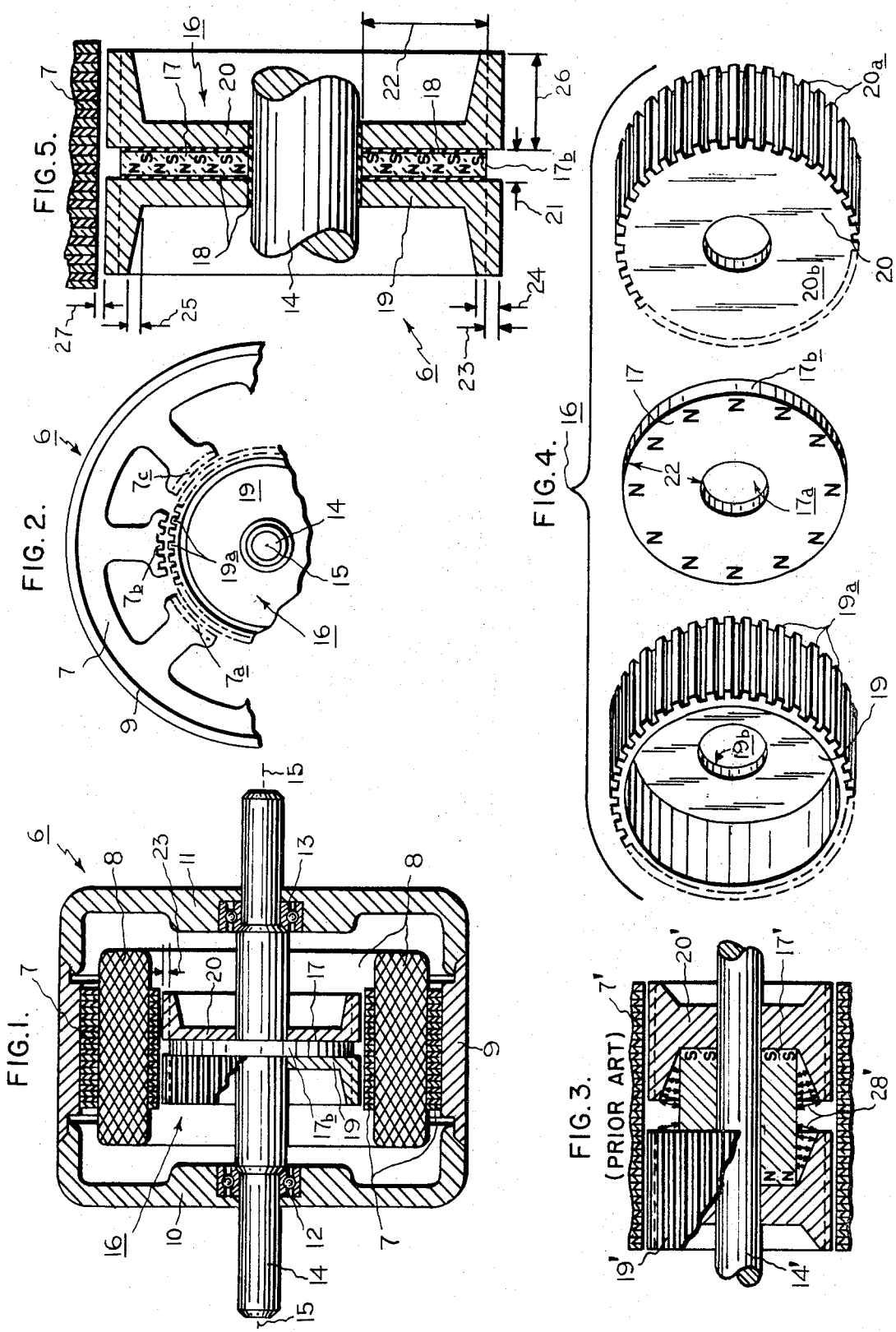

LOW-INERTIA SYNCHRONOUS INDUCTOR MOTOR

BACKGROUND OF THE INVENTION

Electrical synchronous inductor motors, including winding-excited internally-toothed stator poles in surrounding relation to permanently-magnetized externally-toothed rotor structures, have come into extensive use largely because of their precision high-speed synchronous and stepping or indexing capabilities. As is well known, the permanent and electromagnetic magnetic fields which cause the needed attraction and repulsion effects developed in such motors, and which account for their unique operating characteristics, are directed by toothed stator pole faces and by cooperating toothed rotor peripheries which are so related in number and angular distrubition as to result in the desired motive effects when the stator windings are excited appropriately. Construction of the rotor assembly is of particular importance in such motors, especially because rotor inertia is critical in influencing the acceleration and deceleration capabilities of the motor, and, hence, the related uses which the motor can serve, and because the amount and distribution of magnetic and permanent-magnet material in the rotor have such controlling effect in determining the efficiency and torque characteristics of the motor. The configurations and assembly interrelationships of both the magnetic and permanently-magnetized materials of the rotor further govern manufacturing costs, overall motor size, and weight.

Generally, the permanent-magnet element which forms part of the axially-magnetized rotor structure of such synchronous inductor motors has assumed the shape of an elongated cylinder, this being the configuration best suited to the intended axial magnetization of most common magnet materials. Collaterally, in efforts aimed at a space-conserving arrangement of the needed toothed pole pieces at the ends of such elongated magnets, these end pole pieces have been folded back over the magnet ends, after the fashion of face-to-face cups. The axially-extending peripheral teeth on such pole pieces have in this way been given a desirable relatively long length, without at the same time correspondingly increasing the overall length of the rotor and entire motor, but this has been at the related expense of serious inefficiency, and particularly the inefficiency resulting from magnetic leakage or shunting effects between the magnet and the closely-spaced surrounding material of the folded-back cup-shaped pole pieces. Compensatory increases in the radial spacing between the magnet and its surrounding pole pieces, which would tend to reduce the flux leakage and shunting, would only undesirably enlarge the rotor and overall motor diameters, further increase rotor inertia and overall bulk, and lengthen lossy flux paths.

In my copending application Ser. No. 266,421, filed June 26, 1972, there is disclosed an improved synchronous inductor motor wherein the usual elongated cylindrical rotor magnet with folded-back pole pieces is eliminated and, in its place, there is used a substantially annular thin and washer-like magnet having laminated washer-like pole pieces at each end. This results in a relativey short rotor structure which is desirable for many purposes, including multiple-or stacked-rotor motor constructions capable of producing relatively large torques. However, the axial lengths of the external rotor pole-piece teeth are necessarily as short as the thin washer-like pole pieces themselves, and, for even those short axial lengths, collaterally involves relatively high inertia because of the mass of the uniformly-thick pole-piece. Relatively long rotor pole-piece tooth are important in providing area and volume of magnetic tooth material adequate to avoid the limits imposed by flux saturations, and, in accordance with the present teachings, such volume is realized without attendant high inertia and without the aforementioned leakage and shunting difficulties by way of lightweight cup-shaped pole pieces which are in wholly back-to-back relationship and have wholly planar back surfaces separated by an axially-thin magnet. The annular permanent magnets utilized in these low-inertia rotors have relatively small ratios of axial to radial thicknesses, which may be about 1:3 or less, and extend radially fully out to the roots of th teeth formed on the peripheries of the pole pieces, and are not overhung axially by any material of the pole pieces whatsoever, such that there is optimum utilization of material, minimized flux leakage, adequate tooth area to avoid saturation, and such remarkably low rotating mass that significantly faster stops, starts, acceleration and deceleration can be realized.

SUMMARY OF THE INVENTION

By way of a summary account of practice of this invention in one of its aspects, an electrical synchronous inductor motor, including a conventional multi-winding stator in association with multiple internally-toothed poles, is equipped with a lightweight high-efficiency rotor unit in which the rotor shaft supports a thin axially-magnetized permanent-magnet washer disposed between and in abutting endwise relation to the planar backs of identical thin-walled and light-weight cup-shaped pole pieces. These pole pieces, which are axially separated only by about the thickness of the intervening washer, carry equally-spaced axially-extending teeth along the outer peripheries of their cylindrical side walls, and, in accord with conventional practices, these teeth may be displaced from one another by one-half a tooth pitch in the two stacks and are of a predetermined number in relation to the number of the surrounding stator teeth which would occupy a full circular array. Material of the thin permanent magnet extends radially from the central rotor shaft fully to the roots of these external teeth, and the wholly planar outer bottom surfaces of the cup-shaped pole pieces are abutted with the washer-type magnet and have no overhanging relation to the rim of that magnet. The sandwiched assembly of the washer magnet between the back-to-back cup-shaped pole pieces is preferably bonded together and with the shaft by thin broad-area layers of a cement, such as an anaerobic epoxy.

One of the objects of the present invention is the provision of unique and improved electrical synchronous inductor type motors which are particularly suited for high-speed stepping applications and wherein low inertia and magnetic efficiency are enhanced by lightweight rotor structures including a thin axially-polarized magnet intermediate the planar bottom surfaces of back-to-back cup-shaped toothed pole pieces.

Another object is to provide a synchronous inductor type stepping motor of economical lightweight construction in which leakage is curtailed and highly effective use is made of a minimum of magnetic and magnetized materials, as the result of a rotor fabrication involving relatively thin-walled and thin-bottomed cup-shaped pole pieces in a back-to-back relationship with a thin permanent-magnet washer therebetween, the magnet washer being substantially unshunted by pole-piece material and being in optimized broad-area abutments with the pole pieces fully between a central rotor shaft and roots of the peripheral pole-piece teeth.

BRIEF DESCRIPTION OF THE DRAWINGS

Although the aspects of this invention which are considered to be novel are expressed with particularity in the appended claims, further details as to preferred practices and embodiments and as to further objects and features thereof may be most readily comprehended through reference to the following description taken in connection with the accompanying drawings, wherein:

FIG. 1 is a partly cross-sectioned and partly broken-away side view of a synchronous inductor motor embodying the present invention;

FIG. 2 provides a fragmentary end view of a toothed stator and rotor assembly such as that of the motor of FIG. 1;

FIG. 3 illustrates portions of a prior-art type of motor structure, in a partly cross-sectioned and partly broken-away side view, together with rotor leakage flux lines;

FIG. 4 depicts the cup-shaped pole pieces and thin washer-type magnet of the motors of FIGS. 1 and 2, in an exploded relationship;

FIG. 5 is an enlarged cross-sectioned side view of the rotor and part of the stator of the motor shown in FIGS. 1 and 2.

DESCRIPTION OF THE PREFERRED EMBODIMENTS

Having reference to the drawings, wherein the same reference characters designate identical or functionally-corresponding parts throughout the several views, and, in the first instance to FIG. 1 thereof, there is illustrated an electrical synchronous inductor motor 6 having the usual stator assembly in which an elongated stack of generally annular stator laminations 7, threaded axially by conductors of associated stator windings 8, is supported within a casing 9. The latter casing is in turn in cooperation with a pair of end caps, 10 and 11, which mount the usual bearings, 12 and 13, accommodating rotation of the central rotor shaft 14. Shaft 14 is shown double-ended, for mechanical output connections at either side, about the longitudinal axis 15—15. Windings 8 are electromagnetically coupled with the stator laminations and excite the several discrete pole faces, 7a, 7b, 7c, etc., in FIG. 2, in a conventional manner, such as in response to quadrature-related A.C. electrical signals or in response to logic-dictated pulse signals. Inner peripheral surfaces of these stator pole faces are toothed, with the teeth running longitudinally of the motor structure, the stator lamination stack and teeth being as long as required to interact with teeth of the rotor structure concentrically within it.

The cooperating rotor structure, 16, is likewise peripherally toothed, externally, the teeth being of uniform size and angular distribution and bearing a predetermined known relationship to the inner teeth of the surrounding stator pole faces. As illustrated in FIG. 1, the rotor structure is of an overall length, except for shaft 14, which does not exceed, and is preferably just slightly less than that of the axial length of the surrounding stator lamination stack 7. For purposes of improving magnetic-circuit efficiency, magnetic flux leakage and shunting in the rotor structure are dramatically reduced by utilizing an axially-thin permanent-magnet washer member 17 which has very little of an exposed perimeter. As is evidenced by the N-S markings in FIG. 5, that washer-like magnet is magnetized axially, and, because its polarization is in a direction opposite to directions of its geometric elongation, it is preferably made of materal such as a ferrite, a cobalt-platinum alloy, a rare-earth-cobalt alloy, Alnico 8, Alnico 9, or the like, which will readily develop a desirably strong magnetic field despite the unusual configuration. Importantly, the bulk of such a rotor magnet is significantly less than that of a common elongated cylindrical magnet, such as 17' in the FIG. 3 portrayal of portions of a comparable prior-art motor, and this has distinct advantage in relation to resulting rotor insertia and high-speed starting, stopping and stepping operations. Costs of the required magnetic material are offset by the relatively small amounts which need to be used, and any shaping or like mechanical problems which might in many instances be encountered with such materials are largely avoided because of the simple annular circularity and flatness of the washer, and because gluing 18 (FIG. 5) rather than stress-concentrating mechanical fastening is preferably exploited in securing the washer-magnet 17 both to the rotor shaft 14 and to abutting pole pieces 19 and 20. In one suitable construction, the washer-magnet may be about 0.2 inch in axial thickness, 21 (FIG. 5), and about 9/16 inch in radial thickness, 22, the associated rotor shaft 14 having about a 13/32 inch diameter which is accommodated by a central washer opening 17a (FIG. 4). The ratio of axial-to-radial thickness for such washer-magnets is preferably not in excess of about 1 to 3.

The rotor magnet 17 is associated with the aforementioned magnetic-material pole pieces 19 and 20 for the usual purposes in motors of the general type under discussion, each of these pole pieces having the same number of equal-width equal-height external teeth, 19a and 20a, respectively, about their peripheries. Typically, the radial height 23 of such teeth may be about 3/64 inch. In accordance with known practice, the teeth 19a and 20a on the cooperating pole pieces, polarized oppositely by the magnet between them, may be angularly offset from one another, by one-half a tooth pitch, for example. The surrounding stator pole faces 7a, 7b, etc., are also provided with longitudinally-extending teeth of about the same angular width and radial height.

Uniquely, the two rotor pole pieces 19 and 20 are each generally of cup-shaped configuration, with planar bottom or back surfaces, 19b and 20b, respectively, which can be fully abutted with end faces of magnet 17, and which exhibit no axial overhang whatsoever in relation to the cylindrical periphery 17b of magnet 17 when these elements are assembled as shown in FIGS. 1 and 3. Magnet 17 extends radially substantially fully between the exterior of rotor shaft 14 and the roots of teeth 19a and 20a. Thickness of the bottom wall of each of the pole pieces is preferably no greater than needed to avoid saturation in normal operation of the motor, to conserve weight and inertia, and, for the same reason, in the outward axial direction therefrom, the peripheral side walls are made progressively thinner. Because the exteriors of these externally-toothed cup-shaped pole pieces must be generally cylindrical, for proper cooperation with the surrounding stator, the inner side walls are sloped to achieve the thinning and weight reduction. As is shown in FIG. 5, the pole piece side walls are relatively thin at their outer rims, where the overall thickness 24 is only sufficient to provide enough magnetic material below the roots of the teeth to avoid saturation there is normal operation, and to afford ample mechanical strength. From the rims to the bottoms of these pole pieces, the wall thickness increases by an amount 25 dictated by like considerations. Axial length 26 of each of the pole pieces is determined in generally like fashion, with a major objective, being to minimize the bulk of side-wall material which would needlessly increase the resulting rotor inertia. The cup configuration is preferred because, otherwise, inertia would be significantly greater in an alternative uniform-thickness pole-piece constructions yielding the same magnetic-circuit characteristics.

Because the rotor pole-piece teeth do not axially overhang the magnet 17, the leakage flux between these teeth and the magnet is kept exceedingly small; similarly, the fact that the rotor magnet extends radially fully to the roots of these teeth advantageously results in absence of any substantial leakage flux between other parts of the pole pieces and the magnet. Further, because the magnet is very thin axially, there is little void for fringing flux to be shunted between the magnet and the surrounging stator laminations, or directly between the adjoining ends of oppositely-polarized teeth 19a and 20a. Moreover, the radial gap 27 between the rotor and stator teeth is kept small enough, in relation to the axial gap defined by the magnet 17, to insure that substantially all of the magnetic flux traverses preferred relatively low-reluctance tooth-directed paths of travel through the radial gaps, rather than through the larger axial gap between axially-spaced teeth of the two pole pieces, and develops maximum intended torque and/or locking effects for the motor.

The aforementioned improvements in characteristics of the magnetic circuitry may be contrasted with those of the prior-art construction appearing in FIG. 3, where the cup-shaped rotor pole pieces 19' and 20' overhang the elongated cylindrical magnet 17' largely for purposes of conserving axial space. The face-to-face arrangement of cup-shaped parts of pole pieces 19' and 20' there occasions a relatively large amount of fringing flux, designated by flux lines 28', which impairs efficiency. Other reference characters, in FIG. 3, distinguished by single-prime accents, are like those of the other views in relation to elements which are intended to serve generally-similar purposes.

Although it may not at first seem particularly significant, the reduction in leakage flux which is realized with the back-to-back pole pieces having no axial overhang of a thin washer magnet in fact bears a highly important and controlling relation to the lowered bulk and resulting lesser inertia of these cup-shaped pole pieces. The leakage flux existing in prior face-to-face designs, wherein cup-shaped pole pieces extend over the usual long cylindrical magnet in the manner illustrated in FIG. 3, requires that the pole pieces have appreciable thicknesses accounted for solely by the need to accommodate such leakage flux. This adds to the inertia, of course, and adversely affects acceleration and deceleration characteristics of the motor. With the improved construction herein disclosed, wherein the side and bottom walls of the back-to-back cup-shaped pole pieces are significantly thinner because the aforementioned large leakage flux need not be accommodated through them, a rotor torque-to-inertia ratio about twice that of a comparable prior-art motor construction can be achieved. About the same torque obtained in both instances, but the improved construction evidences only about one-half the inertia. Of that reduction in inertia, only about one-fifth is saved via the axially-thin washer magnet, such that the balance is seen to be accomplished by the uniquely-enabled thinning of the side and bottom walls of the cup-shaped pole pieces.

As is evident from the FIG. 1 illustration, the back-to-back arrangement of pole pieces leaves relatively large annular cavities at the ends of the rotor, and, although not shown, such space can be used advantageously to accommodate the rotor bearings and their mountings in the motor end caps, with consequent shortening of the overall motor-casing length. In a simplified modification, wherein the rotor is supported in cantilevered fashion by a single bearing structure only at one end, the latter structure can be nested at least partly within one of the cups, with resulting conservation of motor length.

One or more of the cup-shaped pole pieces herein disclosed may also be utilized in a hybrid rotor construction which also includes one or more of simple lamination-stack pole pieces disclosed in my aforementioned U.S. patent application Ser. No. 266,241; such different pole pieces are compatible for this purpose, inasmuch as neither overlaps the washer magnet, and the cup shaping of course serves to improve inertia of such a hybrid rotor.

Bonding of the rotor parts, via gluing 18, is preferably by way of an epoxy cement such as those sold under the commerical trade names Loctite or Bondmaster, for example, the cement being squeezed very thin by application of pressure during curing. Other fastening provisions may be used, however. Multiple-rotor assemblies, on the same shaft, will afford torque multiplications, and these may be realized through axial stacking of the rotor units which have been described, with suitable non-magnetic spacers being employed between rotor units.

It should be understood that the specific practices and preferred embodiments herein referred to have been discussed in the context of disclosure rather than essential limiation, and that various modifications, additions and substitutions may be effected by those skilled in the art without departure from these teachings; it is therefore aimed in the appended claims to embrace all such variations as fall within the true spirit and scope of this invention.

What I claim as new and desire to secure by Letters Patent of the United States is:

1. An electrical synchronous inductor motor having a rotor structure including a shaft having fixed thereon at least one permanent magnet and a pair of toothed rotor pole pieces of magnetic material associated respectively with the poles of said magnet, and an electromagnetically-excited internally-toothed stator structure closely surrounding said rotor structure, said permanent magnet consisting of a thin, substantially annular washer having a lesser axial than radial thickness and permanently magnetized in the axial direction thereof, at least one of said rotor pole pieces being of substantially cup-shaped hollow form, and each of said pole pieces having teeth extending axially along a substantially cylindrical outer periphery thereof and having a substantially planar end surface in abutting relation to a different axial end of said washer magnet, said planar end surface of said cup-shaped pole piece being on the outside of the closed bottom thereof and the rim of said cup-shaped pole piece being axially spaced from said washer magnet, said pole pieces having no axially-overhanging relation to said washer magnet therebetween, and said washer magnet extending radially from said shaft substantially to said teeth of said pole pieces, and means securing said washer magnet and pole pieces in said abutting relation.

2. An electrical synchronous inductor motor as set forth in claim 1 wherein both of said pole pieces are of substantially cup-shaped hollow form, and wherein said cup-shaped pole pieces are disposed in back-to-back relationship with said planar end surfaces on the outsides of the closed bottoms thereof in sandwiching relation to said washer magnet.

3. An electrical synchronous inductor motor as set forth in claim 2 wherein each of said cup-shaped rotor pole pieces has a closed bottom wall of substantially uniform axial thickness and has side walls of thicknesses diminishing in the axial direction from said closed bottom wall toward the rim thereof, and wherein the material of said magnet extends radially substantially fully between said shaft and the roots of said teeth of said rotor pole pieces.

4. An electrical synchronous inductor motor as set forth in claim 3 wherein said teeth of said rotor pole pieces are of a like radial height, from said roots to the outer periphery thereof, which is small in relation to the axial thickness of said washer magnet, and wherein twice the radial gap between oppositely disposed surfaces of stator and rotor teeth is small in relation to said axial thickness of said washer magnet.

5. An electrical synchronous inductor motor as set forth in claim 4 wherein said permanent-magnet rotor magnet has an axial-to-radial thickness not in excess of about 1 to 3.

6. An electrical synchronous inductor motor as set forth in claim 5 wherein said securing means consists of cement bonding said rotor pole pieces and washer together and to said shaft.

7. An electrical synchronous inductor motor as set forth in claim 5 wherein the back ends of said pole pieces are wholly planar and normal to the axis of said shaft fully between said shaft and the peripheral radial extremities of the teeth thereon.

* * * * *